Feb. 16, 1965 T. D. BIRCHALL 3,169,874
FOOD CANNING SYSTEM AND PROCESS
Filed Sept. 7, 1960 5 Sheets-Sheet 2

INVENTOR.
THOMAS. D. BIRCHALL
BY
ATTY.

INVENTOR.
THOMAS D. BIRCHALL
BY
ATTY.

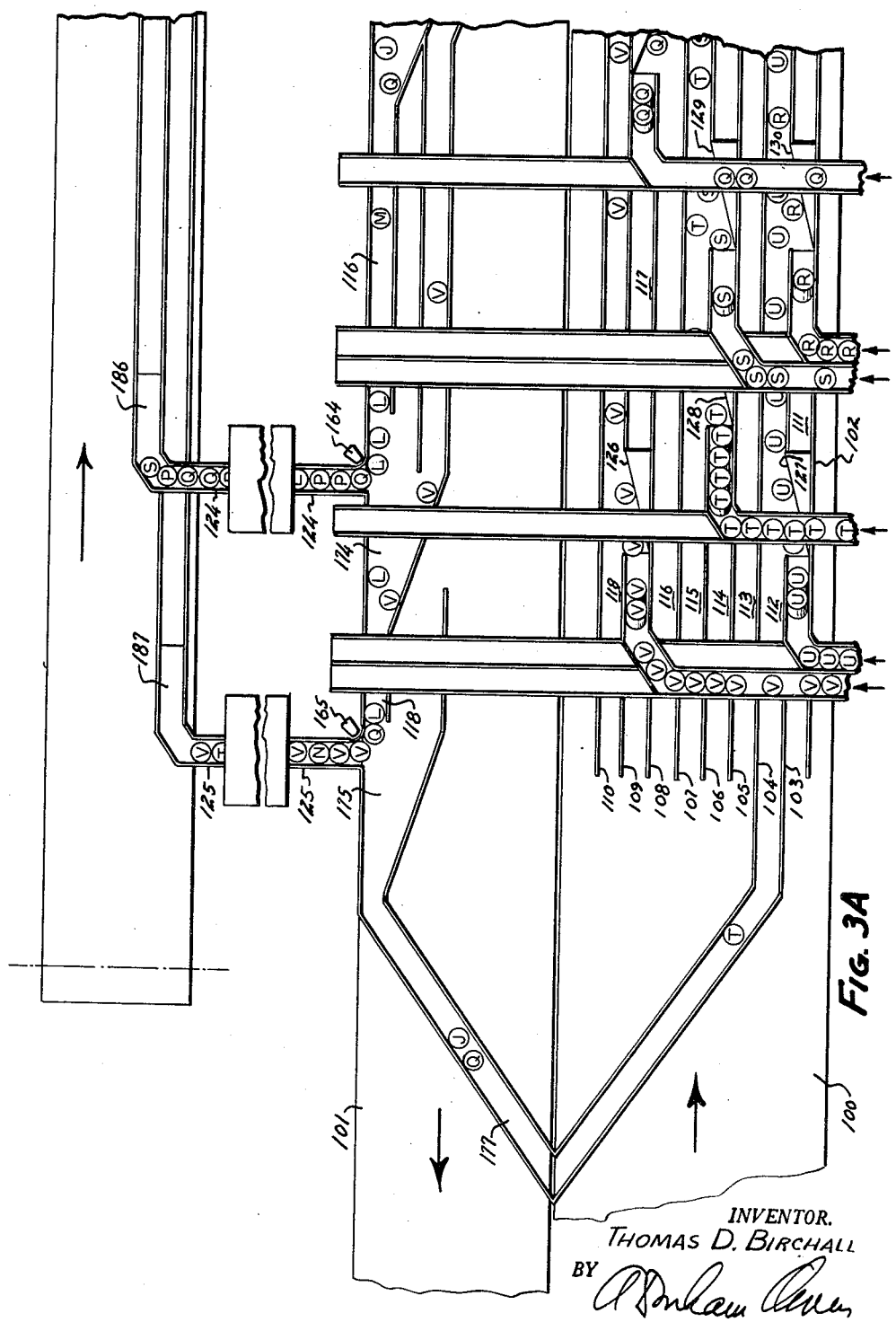

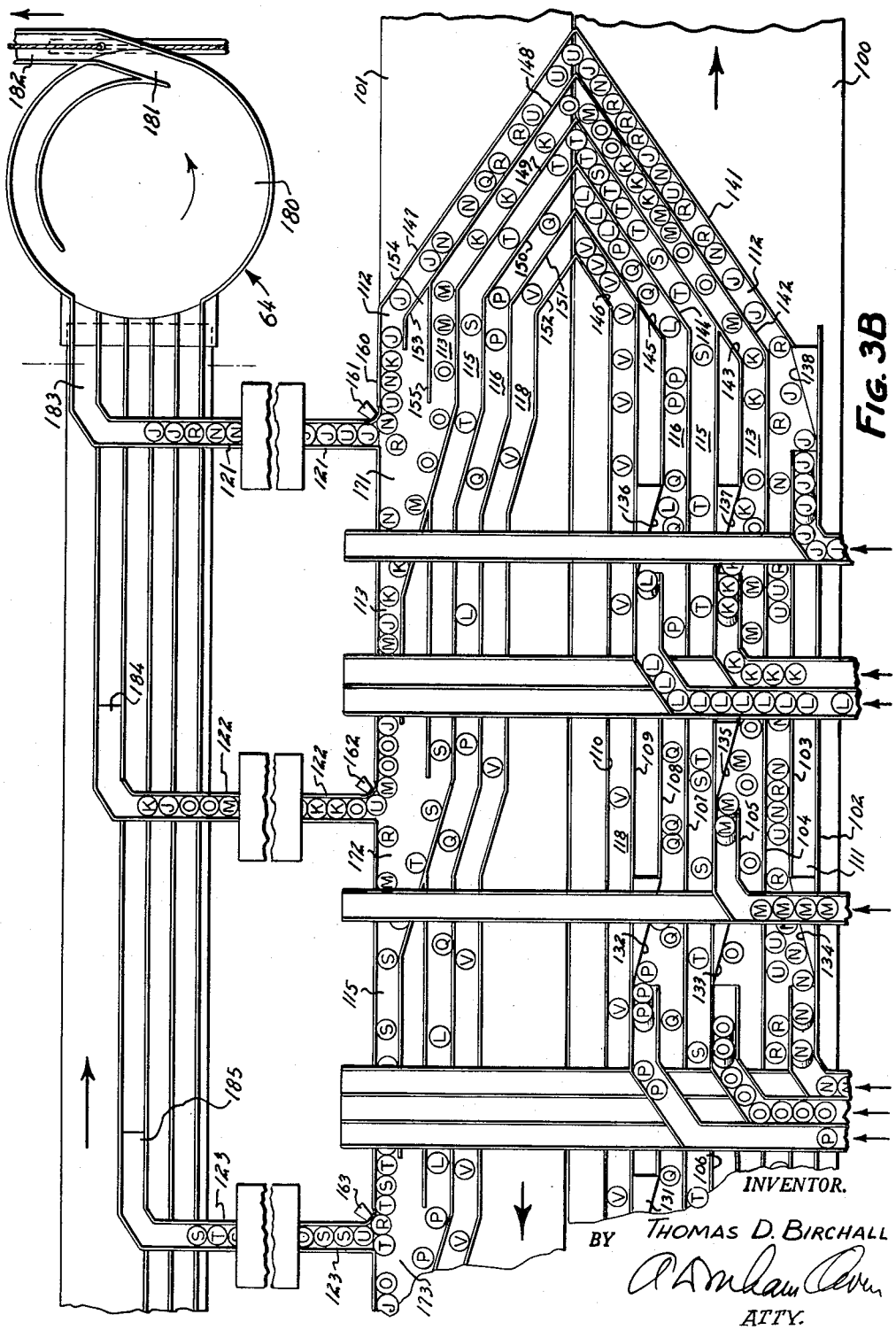

United States Patent Office  3,169,874
Patented Feb. 16, 1965

3,169,874
FOOD CANNING SYSTEM AND PROCESS
Thomas D. Birchall, Turlock, Calif.
(35 The Ridings, Epsom, Surrey, England)
Filed Sept. 7, 1960, Ser. No. 54,534
16 Claims. (Cl. 99—182)

This invention relates to a system and process for food canning.

In the past, when several grades of the same food have been canned simultaneously, it has been necessary to keep all the cans of any one grade together during the processing. For example, suppose that there are six grades of product, which we will call A, B, C, D, E, and F. Heretofore, after six lines of cans had been filled with food of these respective grades, different dilutions of syrup were added to each grade and then each line of cans was fed separately to a cooker. The cans of the different grades were not freely intermixed. This has often meant that the cooking machines could not be utilized to their full capacity. It was necessary to wait until a whole group of cans of one grade had been sent into any particular cooker before beginning to run in the cans of another grade, even though the cooker was accepting cans at only a fraction of its capacity. Therefore, the cannery either had to buy more cookers, or hold up production to complete each grade in groups.

An important object of the present invention is to provide a canning system in which the various grades of prepared raw products can be put separately into marked cans, and the cans can be intermingled freely through the steps of adding syrup, closing, cooking and cooling. Subsequently, the cans are sorted into their proper groups of cans of each grade, but after passing through this canning machinery. In this process it makes no difference which can is fed to which cooker.

One key feature of this invention is that instead of adding various dilutions of syrup to the cans of various grades, a charge of water is added to each can immediately before or after filling, the charge of water determining the dilution of the syrup. Later undiluted syrup is added to all the cans to complete their volume; cans which have no water added, as in many grade A products, will have pure syrup in them, as they should, while the other grades will have syrup at the proper dilution, due to the previous addition of water. Throughout the process, all six grades are processed simultaneously and the cookers are all used to their full capacity.

Another key feature is the use of a novel system of scrambling the filled cans and of feeding them to the cookers, distributing them so that the cookers are used at rates approaching full capacity.

From the foregoing it will be seen that the present invention enables much more efficient use of the canning machinery, makes it possible to intermingle grades without losing control over them, and makes it possible to utilize existing machinery without having to add new cookers while still treating each grade properly.

Other objects and advantages of the invention will appear from the following description of a preferred embodiment.

In the drawings:

FIGS. 3A and 3B are a top plan view of a converging and distributing means, and with even more grades, broken and shown on two sheets, and also of a suitable single filer, the view being broken to omit several stages between the distributing means and the single filer.

Figure 1A:
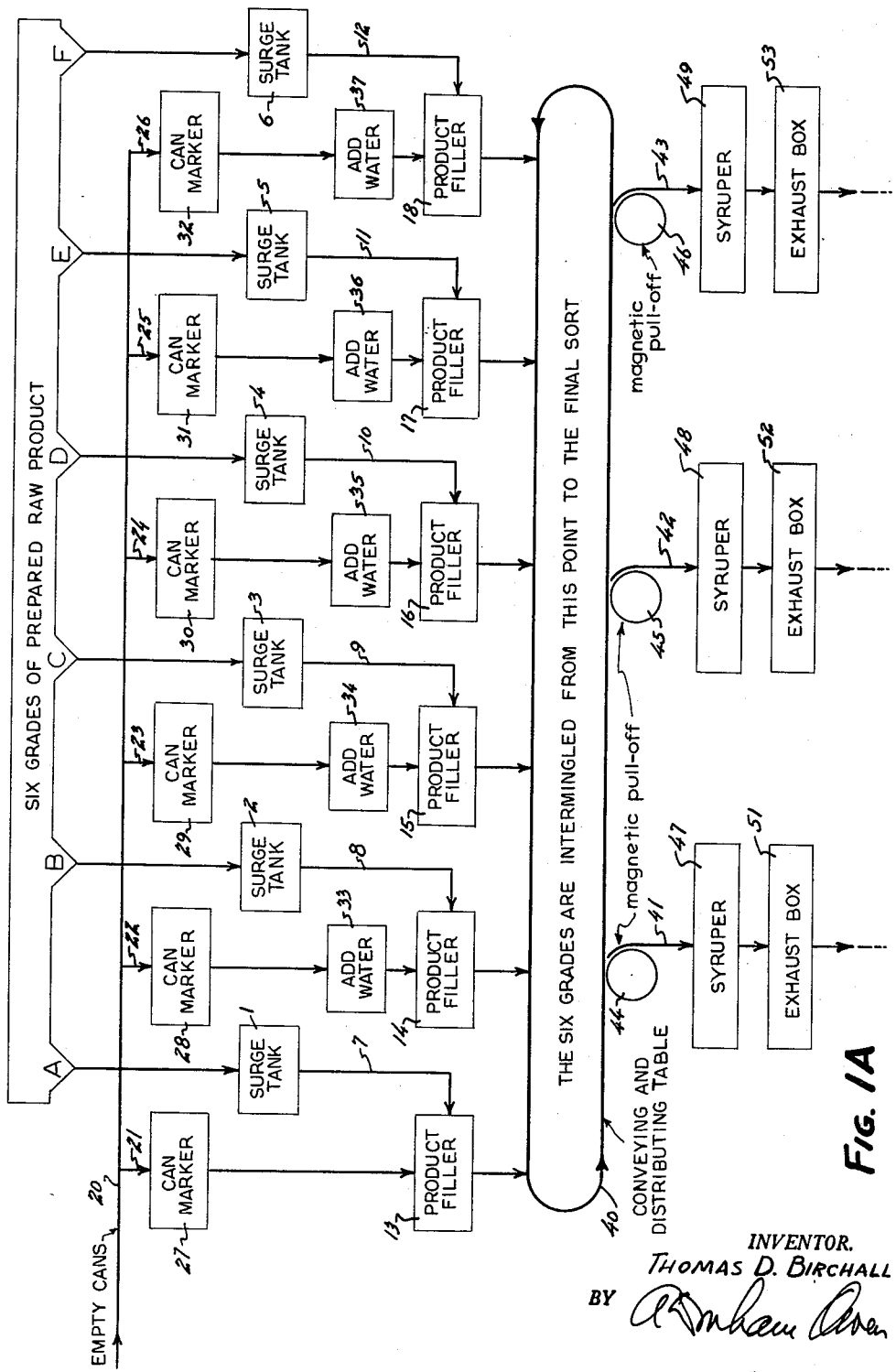
FIGS. 1A and 1B are a flow sheet indicating a preferred method of practicing the system of this invention, broken and shown on two sheets in order to make the sheet readable.
Figure 1B:
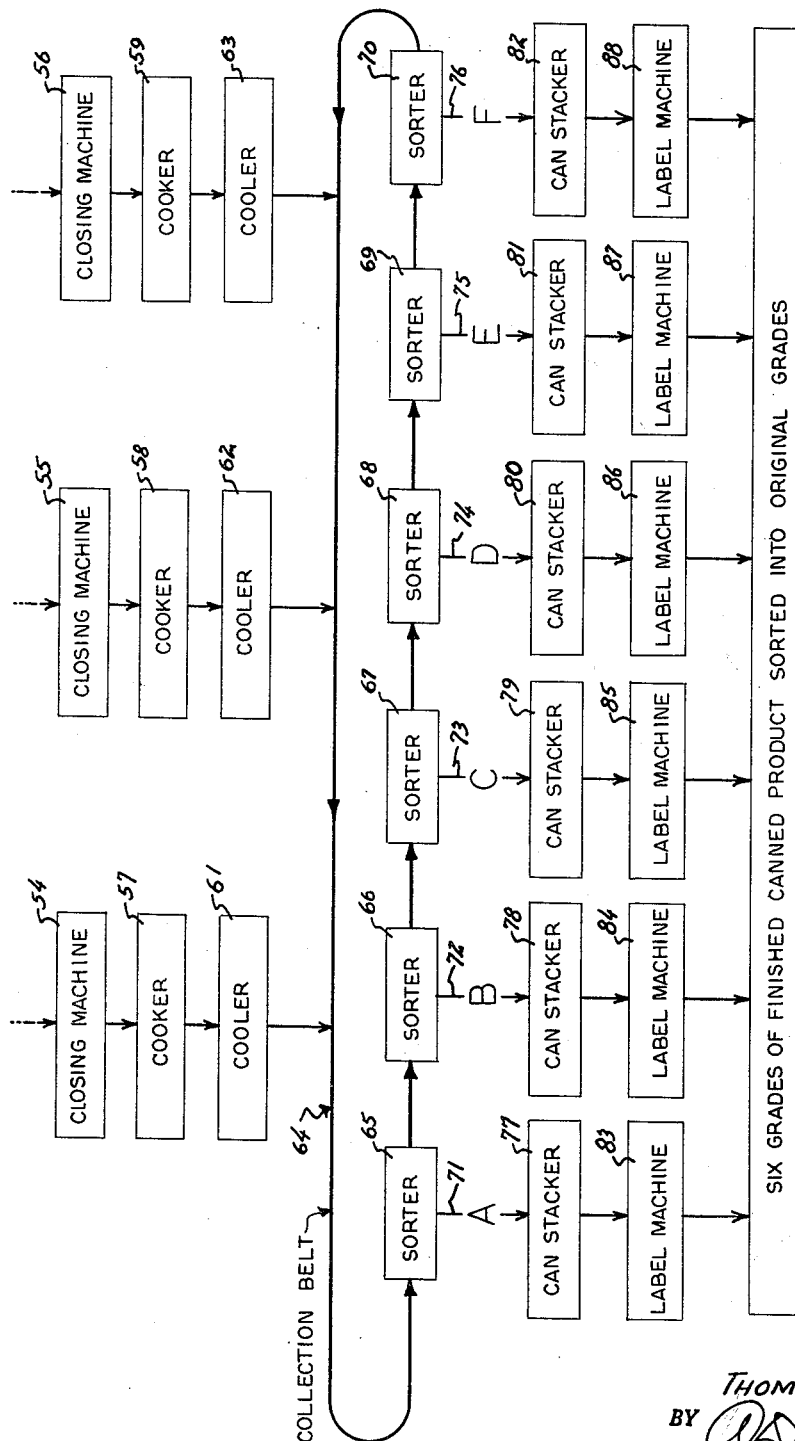

For the purpose of example, FIGS. 1A and 1B show a process using six grades of prepared raw product, denominated here as grades A, B, C, D, E and F. It will be assumed that these are all the same kind of product and so get the same basic processing. For example, they may all be peaches, but of varying quality, or they may all be sweet potatoes, or they may all be some other one food product. It will be assumed that grade A is the grade of highest quality and that the other grades are of successively lower quality, grade F being the poorest quality to be processed here. All these grades are to be canned according to their grade-standards, with varying dilutions of syrup, but they are to be cooked the same amount of time, since they are the same food. Eventually, they are to be labeled with different labels reflecting the differences in grade.

According to the present invention, the grades A, B, C, D, E, and F are fed, respectively, to separate surge-tanks 1, 2, 3, 4, 5 and 6. These surge tanks (see FIG. 2 and further description later) are preferably capable of holding up to 500 lbs. of the fruit or vegetable to be canned. They are so constructed as to receive the product at varying rates, but to release the product at a uniform rate, to respective feed-lines 7, 8, 9, 10, 11 and 12, the rate of release being adjusted to suit the desired rate of production. The purpose of the surge tanks 1, 2, 3, 4, 5 and 6 is to regulate the flow of the raw product to respective fillers 13, 14, 15, 16, 17 and 18. Since most canned products are graded by size before canning, the surge tanks 1, 2, 3, 4, 5 and 6 tend to remove the fluctuations in volume caused by the changing sizes of the various lots being processed. The procedure applies particularly well to cling peaches, where the variation in size from lot to lot has been a troublesome problem. Furthermore, cling peaches are sufficiently hardy to stand the surge tank procedure with no ill effects.

Meanwhile, empty cans are being fed to a conveyor line 20 which distributes them to six respective lines 21, 22, 23, 24, 25 and 26. Each line corresponds to one of the grades of the raw product to be canned. Each can in its respective line goes immediately to a can-marker 27, 28, 29, 30, 31 or 32, where identifying insignia is applied to the can, the kind of insignia applied being determined by the kind of sorting to be used later. Preferably, the type of sorting to be used later is of the type disclosed in my issued U.S. Patent 2,817,438, in which an electric eye is used. By printing a band about ½ inch wide of special can-marking ink around the full periphery of the cylindrical can, and by each can marker 27, 28, 29, 30, 31 and 32 placing its bands at different heights on the can from the bands of the other can markers, the vertical position of the bands will correspond to the grade in the can.

From the can markers 27, 28, 29, 30, 31 and 32, all but the highest grade (and that grade, too, if specifications call for it) go to a device 33, 34, 35, 36, and 37 in which a carefully measured charge of water is added. Each device 33, 34, 5, 6 and 37 adds the same amount of water to each can in its line; the amount may be different from that added in other lines, or two or more grades may add the same amount. Specifications normally call for the highest grade to be packed in the most concentrated syrup. In any event, the dilution of the syrup is determined at this point, because only undiluted syrup will be added later, and it will be added until the can is full. A device may be used which adds an exact amount of water to the can. Preferably, these devices 33, 34, 35, 36 and 37 are just ahead of the fillers, but they may immediately follow the fillers, if desired.

The addition of water closely adjacent to the fillers is a very important feature of the invention; it is one of the things that makes it possible to intermingle the cans after filling without causing trouble. Since the dilution of the syrup is determined by the addition of this initial charge of water, the subsequent addition of syrup simply filling the can, it is possible to obtain complete control. The added syrup is diluted by the water already in the can to exactly the correct amount of concentration of syrup in the finished product. Thus, the grade A can in this example will have no dilution; the heavy syrup directly from the syruper will not be diluted because there is no water in the can to dilute it. The various other grades will receive, in the final analysis, diluted syrup, because they receive an initial charge of water.

From this point the cans pass to their respective product fillers 13, 14, 15, 16, 17 and 18, where they are filled with the desired amount of product to be canned. As they approach their filler, some cans (those of the highest grade) are empty, whereas other cans contain a charge of water; when they leave the filler, the cans containing the highest grade product contain *only* that product, whereas the other cans contain not only the product but also a critically measured amount of water. Since the product also is carefully measured in the product filler, the amount of volume that remains unfilled is determined. The cans may be filled by weight, or by volume, as desired. Regular commercial fillers may be used, many of which are available on the market, and this step is conventional in every way except that it has been preceded by controlled addition or omission of water.

From the product fillers 13, 14, 15, 16, 17 and 18, the cans pass to a conveying and distributing table 40. A similar table 40 is shown in detail in FIGS. 3A and 3B and will be described later. It is a device to which all the cans are added, and all six grades are, from that point on, intermingled until they have been cooked, cooled, and once again sorted. The table 40 accepts cans at random from the various fillers and combines the flow from two or more, usually from several (in FIG. 1A six, in FIGS. 3A and 3B, thirteen) into a lesser number of lines of cans. Once the cans are on this table 40, they are for all practical purposes intermingled and will get no treatment different from each other until they arrive at the final sorting station. The table 40 is made so that, if all the lines to the cookers happen to be blocked at any one moment, the excess cans are recirculated, as will be explained later.

The next step in the process is for the conveying and distributing table to distribute the cans to the cooker lines which are smaller in number than the filler lines. In FIG. 1A, three lines 41, 42, and 43, are shown; corresponding to three cookers that are available. Each line is provided with a respective pull-off device 44, 45 or 46. Preferably, these pull-off devices are magnetic, with bypass convergers, located at the take-off points on the distribution table, as will be described later in connection with FIGS. 3A, 3B, and 4. They are very important in the efficient operation of the cooker lines 41, 42 and 43. Each of them has a permanent magnet located adjacent the discharge side of the distribution belt, plus a special converging plate located on the downstream side of the take-off. The action of this combination is such that every can passing next to the magnetic pull-off falls under the influence of the magnetic field of the device 44, 45 or 46, and by its attraction is usually pulled off the table 40 into the line 41, 42, or 43. If, however, any particular line is full at the instant any given can arrives at the pull-off point for that line, the friction of the conveyor table 40 overcomes the attraction of the magnet and the can passes the opening.

Let us assume, for the moment, that the line 41 already has been filled to capacity as a can approaches the magnetic pull-off 44. That can will not go into the line 41, and will not block the opening, but will be carried by the table 40, toward the pull-off magnet 45. The can is converged with the other cans directed by the table 40 to the line 42 and is presented with them to that station. If that station can accept the can in question, it then is pulled off into line 42; if that line also is blocked, it passes to the next pull-off magnet 46, in the same manner. Since every line 41, 42, 43 has the same syrup, and since all cans which require diluted syrup have previously been charged with the proper amount of water, it makes no difference which cooker line any particular can goes to and through. By overloading each line in turn, it becomes possible to operate all the cooker lines 41, 42, 43 at the highest possible over-all efficiency. The overflow from the last cooker line 43 is directed back onto the table 40 for recirculation, and is combined with the stream of cans being directed to the first cooker line 41.

An important advantage of this system is that a brief shutdown of one cooker line 41, 42, 43 does not cause a shutdown of the entire cannery. The excess is absorbed automatically in the other cooker lines, until full production is restored. Furthermore, the surge tanks 1, 2, 3, 4, 5 and 6 store sufficient raw product to absorb a brief shutdown. The combination of these two devices serves to smooth out the flow and makes for an efficient operation. The magnetic pull-offs do not jostle or jar the cans. There is no spillage of raw product, and the mechanism is practically jam-proof. There are no moving parts in the pull-off magnets 44, 45, 46 and they require no maintenance, once proper adjustment has been made.

The cans in their respective lines 41, 42, and 43 pass next to substantially identical syrupers 47, 48 and 49. It has already been stated that each syruper 47, 48, and 49 merely fills the cans to their remaining capacity, so that the grade A cans have full syrup, and the cans of other grades have their syrups diluted by the amount of water previously placed within them. It cannot be overstressed that this point is vital to the intermingling of the cans of various grades, because it requires only one type of syruper to handle all of them.

From the syrupers 47, 48, and 49, the cans in each line pass to respective exhaust boxes 51, 52, and 53; and from there to respective closing machines 54, 55, and 56 (FIG. 1B). These devices are conventional in the art, and the only comment to be made here is that, once the can has been closed, the significance of the mark on the can becomes apparent, for from here on it is impossible to identify the cans otherwise than by the can marks. The cans next pass to their respective cookers 57, 58 or 59. Any kind of continuous cooker may be used. Steam-flow closing machines, continuous cookers and coolers can be used, of any type, either pressure or atmospheric. All this equipment is conventional and is used in the conventional manner.

The cooked cans pass to conventional coolers 61, 62 or 63, and from there they pass to a collection belt and single-filer 64 (see FIGS. 3A and 3B). The output of all the cooker lines is collected on a belt and run to a single-filing device, such as a disc. The purpose is to collect all the cans of a similar size, regardless of content, and convey them away in a single file. It may be added that this device makes it possible to use cans of different sizes in all the lines heretofore, and to sort them out by size at this point.

The single-filer 64 then passes all the cans to a series of binary sorters 65, 66, 67, 68, 69 and 70. Preferably, these sorters are electric-eye sorters of the type disclosed in my Patent No. 2,817,438. In these devices, the single line of moving cans is separated at each stage into two lines, one continuing on the belt 64 and the other going off the belt to a respective can line 71, 72, 73, 74, 75 and 76. The mark denoting the contents of the can then enables it to be sorted out by grade, so that each grade then goes into its own individual line. This is binary sorting by grade of the collected cans. Each line 71, 72, 73, 74, 75, and 76 preferably goes to a can stacker 77, 78, 79, 80, 81, and 82, where the cans are stacked and held until it is desired to label them. At such a time, they go to a label machine 83, 84, 85, 86, 87 or 88, where they are labeled as desired to reflect the grades that have been produced. The stacker may stack them on conventional pallets which discharge them onto a set of rollers for movement by standard lift-truck to storage areas in the warehouse and, if desired, the same kind of stacker can be used again after labeling, or they can be packed directly into boxes of the proper grades and sent to the stores.

It will be noted that the invention utilizes much conventional equipment, but some of it is utilized in a novel method and a novel system. The system is very efficient and enables the most efficient possible use of cookers in a canner. The new equipment required is very simply constructed and highly advantageous.

Figure 2:
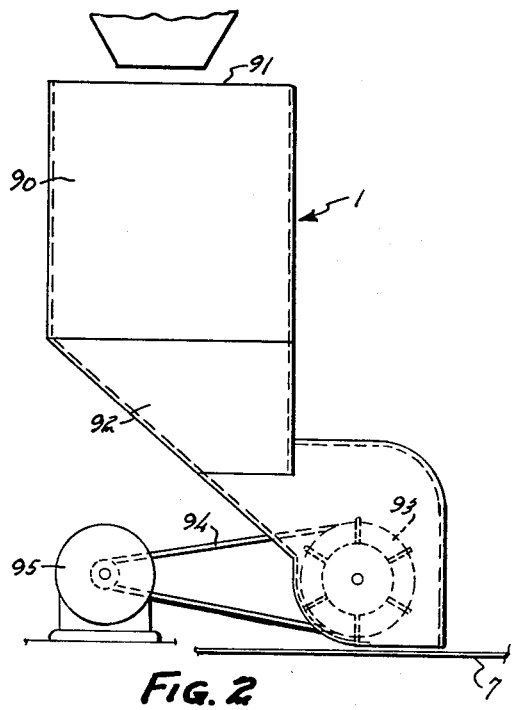
FIG. 2 is a view in side elevation of a surge tank that may be used in the invention.

Thus, the surge tanks 1, 2, 3, 4, 5, and 6 may be constructed as shown in FIG. 2 as a single cubic tank 90 having an open upper end 91, into which batches of fruit or other food may be dumped from time to time or may be fed from conveyors, and a hopper-shaped lower end 92 leading to a metering wheel 93 that deposits the food at a uniform rate on the conveyor belt 7 going to the filler 13. The metering wheel 93 may be driven by a belt 94 from a variable-speed drive means 95, whose speed is controlled at any desired rate by the foreman or plant manager. The wheels 93 of all the tanks 1, 2, 3, 4, 5, and 6 may be set at different rates corresponding to the differences in amounts of each grade that are available. From this it will be apparent that even if the tank 90 is fed in batches at very irregular intervals, the wheel 93 will assure uniform distribution along the belt 7, so long as there is always some food in the tank 90.

A specific example of a conveying and distributing table 40 that I have devised is shown in FIGS. 3A and 3B. Here, as an example, I have shown the table 40 collecting the cans from thirteen different filling lines and distributing them to five different cooking lines.

The table 40 of FIGS. 3A and 3B comprises two belts 100 and 101 moving in opposite directions. That is, the belt 100 moves to the right and the belt 101 to the left. The return lines are not shown, but endless belts are used. Along each belt 100 and 101 a series of partitions parallel to the belts are used to provide a series of parallel lanes, and at certain locations converging plates are used to transfer cans from one lane to another. Thus, the belt 100 is provided with an outer end wall 102 and partitions 103, 104, 105, 106, 107, 108, 109, and 110, providing eight lanes 111, 112, 113, 114, 115, 116, 117, and 118.

Filler lines J, K, L, M, N, O, P, Q, R, S, T, U, and V are shown and the cans from these various lines are identified throughout FIGS. 3A and 3B by the letter of the line they came from. The filler lines are located at various heights and the cans are shunted from their lines by diagonal plates and sloping ramps into various lanes in the belt 100. Thus the cans J from filler line J go to the lane 101, as do the cans N, R and U; the cans K, M, O, S and T initially go into the lane 114; the cans L, P and Q go into the lane 117, and the cans V go into the lane 118.

To prevent free movement of the cans from the filler lines to the belt 100, converging plates are used at various places to transfer the cans from one lane to another lane. Thus, the lanes 111 and 112 form one group, the lanes 113 and 114 another group, the lanes 114 and 115 form another group, the lanes 116 and 117 another group, and the lane 118 a solitary lane, in this example. This gives five groups of lanes, one for each cooker line 121, 122, 123, 124 and 125, which is desirable.

As shown in FIGS. 3A and 3B, the collection into groups is done as follows, starting from the left end: overflow cans that have already gone once around the table 40 are routed to the lane 112 (FIG. 3A) so that they can be offered to the first cooker line 121. The cans V move first into the line 117 and then are moved by a converging plate 126 into the lane 118 and continue then as the only lane definitely held for the last cooker line 125. The cans U move first into the lane 111 and then are moved by a conveying plate 127 into the lane 112, where they are then mixed with the overflow cans. The cans T move initially into the lane 114 and from there are moved by a converging plate 128 into the lane 115. The cans S move initially into the lane 114 and then are moved by a converging plate 129 to join the cans T in the lane 115, these two lines of cans being destined to be offered first to the cooker line 123. The cans R move first into the lane 111, and then a converging plate 130 moves them into the lane 112 where they join the overflow cans and the cans U.

The cans Q move first into the lane 117 and are then moved by a converging plate 131 (FIG. 3B) into the lane 116. The cans P also move first into the lane 117, and then a converging plate 132 guides them into the lane 116, where they join the cans Q. The cans O move via the lane 114 and converging plate 133 into the lane 113. The cans N move via the lane 111 and converging plate 134 into the lane 112, where they join the overflow cans and the cans U and R. The cans M move into the lane 114 and then are shunted by the plate 135 into the lane 113, where they mix with the cans O.

The cans L are first moved into the lane 117 and then converging plate 136 moves them into the lane 116, along with the cans P and Q scheduled for first offer to the fourth cooking line 124. The cans K are moved via the lane 114 and plate 137 into the lane 113, where they are intermingled with the cans M and O scheduled for first offer to the second cooking line 122. Finally, the cans J move via the lane 111 and converging plate 138 into the lane 112 where they are intermingled with the cans N, R, V and the overflow cans, all scheduled for first offer to the cooker line 121. There are intentionally more cans in the lane 112 than the cooker line 121 can accept, in order to assure that the cooker line 121 will be kept full. The overflow rate from the cooker line 121 plus the cans in lane 113 should also exceed the acceptance rate of the second cooker line 122, to assure its utilization at full capacity.

Angle partitions 141, 142, 143, 144, 145, and 146 move the lanes 112, 113, 115, 116, and 118 diagonally across the belt 100 and onto the belt 101, when they reverse direction, being guided by diagonal partitions 147, 148, 149, 150, 151, and 152.

A longitudinal partition 153 defining the inner side of the lane 112 stops at that lane approaches the first cooker line 121. At this time a dummy lane 154 and partition 155 space the lane 112 from the lane 113. The cans in the lane 112 are then moved by the belt 101 along an outer shield 160 of non-magnetic material that forms the outer boundary holding the cans on the belt 101. The shield 160 may be of non-magnetic stainless steel, and it is interposed between the cans and permanent magnets 161, 162, 163, 164, 165 at each of the cooking lines 121, 122, 123, 124, and 125, curving around into the lines.

Figure 5:
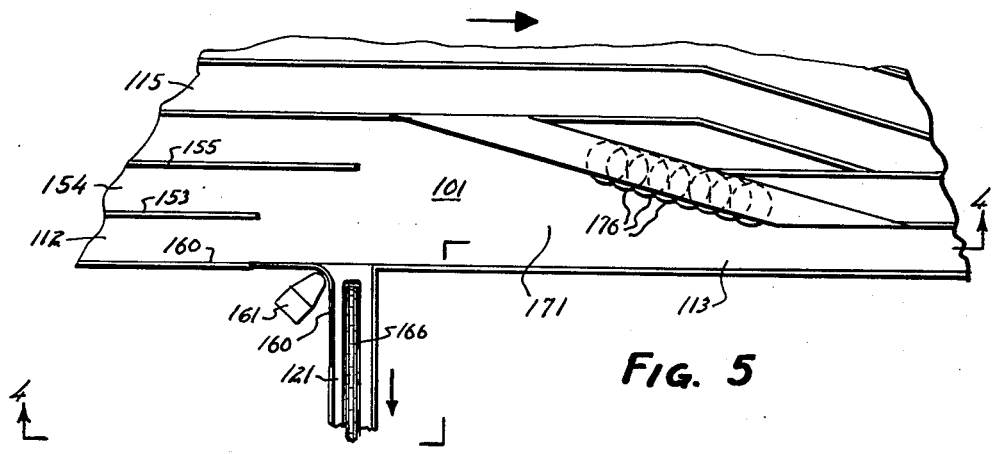
FIG. 5 is an enlarged fragmentary top plan view of a portion of FIG. 3 in the neighborhood of the FIG. 4 area.
Figure 4:
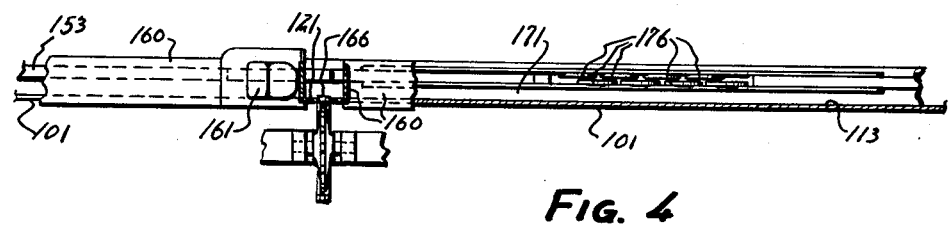
FIG. 4 is a fragmentary view in elevation and partly in section of one of the magnet-pull-off stations.

The details of the pull-off station shown in FIGS. 4 and 5 will be most helpful in understanding the system, for substantially the same thing happens at each pull-off station. Each cooker line 121, 122, 123, 124 and 125 includes a powered chain conveyor 166 that moves to the syruper, exhauster, cooker, etc. at a steady rate. This chain conveyor 166 picks up the cans only after they have entered its cooking line. The cans from the lane 112 are caused to enter the cooking line 121 by the pull of the magnet 161, acting through the non-magnetic shield 160 so that it is more readily broken away from than if there were direct contact between the magnet and the can.

So long as the cooker line 121 is not plugged by a can too close to its inlet from the lane 112, the next can will be pulled into the line 121 by the magnetic attraction of the magnet 161. However, if the entrance to the line 121 is plugged by a can, the next can cannot enter, and belt 111 carries it on away from the magnet 161 into a converging stage 171. There is a converging stage 172 beyond the magnet 162 and cooker line 122, and there are other converging stages 173, 174, and 175 for the other cooker lines. At the stage 171, the excess cans from the lane 112 that could not be moved into the line 121, because that line 121 was already filled to capacity, join the cans in the lane 113 for offer to the second cooker line 122. The space provided by the end of the partition 153 and by the blank lane 154 gives room for the movement of the rejected cans to move away from the cooker line 121 and to move into the lane 113, which is moved to the edge by a diagonal. During the diagonal movement freely rotating discs 176 assist in converging the bypassed or rejected cans into the line 113.

The cans in the line 113 are offered to the second cooker line 112, which is thereby kept filled to capacity. Rejected cans, that is, cans that cannot be accepted by the coker line 122 because of that line being filled to capacity, move through the converging stage 172 into the next lane 115, which at that place moves diagonally to the outside of the belt 101. The convergence is just as before, and the cans are then offered to the third cooker line 123.

Cans which the line 123 is unable to accept move via the converging stage 173 into the lane 116 for offer to the cooker line 124. The excess from there is offered to the cooker line 125, which is the only one that is not likely to be used at full capacity all the time, and even it may be used at a volume near capacity. At least, the over-all capacity of all the cookers is fully utilized. The final excess stage 175 is a simpler stage, since there is only the excess from the line 125, and it is put into a reversal and recirculation line 177 for movement diagonally across the belt 101 onto the belt 100 and passing into the lane 112 for representation to the first cooker line 121.

Note that the cans from the filler lines J, N, R, and U are being energized on the intake side 100 of the table 40 into a single lane 112 and that they are fed from there principally to the first cooker line 121; however, by means of magnetic pull-off 161 only a quantity of cans sufficient to keep the line 121 up to full capacity are taken into this line. The remainder are by-passed and converged with the flow from the filler lines K, M, and O, and after being converged into a single line, these cans are directed to the second cooker line 122. Thus, the cooker line 122 carries cans from the filler lines K, M and O, plus the overflow of the cans J, N, R and U from the cooker line 121. The third cooker line 123 is carrying principally cans from the filler lines S and T plus the overflow from the cooker line 122. The fourth cooker line 124 is carrying cans from the filler lines L, P, and Q plus the overflow from the cooker line 123. The fifth and final cooker line 125 is carrying principally cans from the filler line V plus the overflow from the cooker line 124. Also, provision is made, so that the overflow from the last cooker line 125 can be recirculated back to the first cooker line 121. This provides a means of utilizing all the cooker lines to the greatest efficiency.

The use of the magnetic pull-offs 161, 162, 163, 164, and 165 which are *non-positive* makes possible the use of such a system. The cans are pulled off into the first available cooker as long as it will take them. When the line 121 becomes overloaded, the magnetic pull-off 161 allows the excess cans to escape without damage. They can then be converged with the next line of cans and presented to the next cooker. This process repeated at each cooker leads to high efficiency.

After the cooking, the cans are put into a single filer 64. This device may comprise a rotating disc 180 having an output gate 181 leading into a single-file cable line 182. Input to the disc 180 may be by five lines 183, 184, 185, 186, and 187, one from each cooker line 121, 122, 123, 124, and 125.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a food canning system wherein several grades of the same product are canned simultaneously, the combination of: a plurality of food product fillers, each used for only one product grade, means for sending a line of marked cans to each said filler, there being a different mark for each grade; means closely adjacent each said filler for charging the cans for each filler with a measured quantity of water, the quantity being different for each grade; means for intermingling the cans from all said fillers; syruping means for filling such empty space as remains in each can with undiluted syrup after said cans have been intermingled; a plurality of substantially identical cookers, there being fewer cookers than product fillers and each giving substantially the same cooking, each said cooker having one said syruping means and a can closer associated therewith; means sending the cans from said intermingling means to said cookers regardless of grade, to enable efficient use of said cookers so that the cookers are supplied with the full output of all the fillers up to the capacity of the cookers; collection means for all said cans from said cookers; and means for sorting the collected cans by grade, according to the mark thereon.

2. The combination of claim 1 having a surge tank for each said filler, each said surge tank having means for receiving a food product in irregular increments and means for sending said product to said filler in regular increments.

3. The combination of claim 1 wherein said marks are applied by marking means, each said filler having a separate marking means.

4. In a system for canning several grades of the same food product simultaneously, the combination of a plurality of means for filling grade-marked cans with said product; diluting means associated with and closely adjacent to some of said filling means, for adding a measured charge of water to each can, the amount added depending on the grade; means for then intermingling the cans; means for then adding undiluted syrup to all the intermingled said cans; a plurality of means smaller in number than said means for filling for processing the syruped cans substantially identically regardless of grade according to the maximum efficiency of the processing equipment; and means for sorting the cans after processing according to their grade mark.

5. The system of claim 4 wherein said processing means includes a series of conveyors serially arranged with respect to said intermingling means; means for offering cans to the first of said series to its full capacity; and means for offering overflow from said first of said series to a succeeding conveyor.

6. The system of claim 5 wherein said last-two-named means include stationary permanent pull-off magnets, one adjacent the input side of each conveyor.

7. In a canning system wherein several grades of the same product are canned simultaneously, the combination of: a plurality of product fillers, each having a surge tank for receiving food at varying rates and for sending it to said filler at a consistent rate, some of said fillers being used for different product grades than others; a can line for each filler for sending unfilled cans thereto, each said can line having indicia marking means for differentiating the various grades, there being a different mark for each grade, and means closely adjacent all but those said fillers used for the top quality grades to place in the cans for all grades except the top quality a measured quantity of water, the quantity being different for each grade; intermingling means for mixing the cans from said fillers; a plurality of cooking conveyors, each having means for filling such empty space as remains in each can with undiluted syrup, the dilution in the can thereby depending on the previously given quantity of water; means for distributing the cans from said intermingling means among said conveyors in such a manner that a first said conveyor has a can added thereto if its capacity is not full and if it is full said can passes on to the next said conveyor that is not full, and so on, said distributing means having means for recirculating those cans that find all said conveyors full; closing and cooking means along each said conveyor; collection means for all said cans from the cooking means; and means for sorting the collected cans by grade, according to the earlier applied indicia.

8. In a food canning system wherein several grades of the same product are canned simultaneously, the combination of: a plurality of food product fillers, some of said fillers being used for different product grades than others; a can line for each filler for sending unfilled cans thereto, each said can line having indicia marking means for differentiating the various grades, there being a different mark for each grade, and means adjacent each said filler except those for the top quality grades to place in the cans for all grades except the top quality a measured quantity of water, the quantity being different for each grade; means for intermingling the cans from said fillers; a plurality of cooking conveyors, smaller in number than said product fillers, each having means for filling such empty space as remains in each can, after the intermingling, with undiluted syrup, the dilution in the can thereby depending on the previously given quantity of water; means for distributing the cans from said intermingling means among said conveyors in such a manner that a first said conveyor has a can added thereto if its capacity is not full and if it is full said can passes on to the next said conveyor that is not full, and so on; closing and cooking means along each said conveyor so that the full capacity of the cookers can be used regardless of the output of any one filler; collection means for all said cans from the cooking means; single-filer means connected to said collection means and means for binary sorting of the collected cans by grade, according to the earlier applied indicia.

9. A canning process for simultaneous canning of several grades of the same food product, comprising the steps of: sending cans to a plurality of filling lines, each line being used for a single said grade, filling marked cans for each line with the product allocated to that grade, placing a measured charge of water into the cans of some grades to serve as a syrup diluent, intermingling the cans of the various grades; distributing said intermingled cans among a plurality of separate cooking lines smaller in number than said filling lines according to cooking efficiency and regardless of grade, adding sufficient syrup to all said intermingled cans to fill them, closing and cooking in substantially identical manner the cans in all said cooking lines, and sorting the cans by grade after cooking according to their grade.

10. A canning process for simultaneous canning of several grades of the same food product, comprising the steps of: forming a plurality of filling lines, each line being for a single said grade, marking each grade of cans in a manner enabling later separation by grade, placing water into each can of some lines as a syrup diluent in an amount to achieve the proper concentration of syrup after the later addition of the product and undiluted syrup, filling the cans in each filling line with the product allocated to that grade, intermingling the cans of the various grades, pulling each of said intermingled cans into one of a series of separate but substantially identical cooking lines smaller in number than said filling lines, so that a first cooking line is held at capacity and excess cans go to a second line until it is at capacity and so on, adding syrup to said pulled cans to fill them, exhausting, closing, cooking, and cooling the cans in all said cooking lines substantially identically and then sorting the cans by grade therefrom according to their marking, to form a different line for each grade.

11. A canning process for simultaneous canning of several grades of the same food product, comprising the steps of: forming a plurality of separate filling lines, each said line being for a single grade, marking each can in each line of cans in a manner enabling later separation by grade, placing water into each can in at least some lines as a syrup diluent in an amount to achieve the proper concentration of syrup after the later addition of the product and undiluted syrup, filling the cans in each line with the product allocated to its grade, intermingling said filled cans and sending each of the filled cans from all said lines into one of a series of separate but substantially identical cooking lines smaller in number than said filling lines without segregation by grade, sending them so that a first cooking line is held at capacity and excess cans go to a second cooking line until it is at capacity and so on, adding syrup to the cans in each said cooking line to fill them, exhausting, closing, cooking, and cooling the cans in all said cooking lines in a substantially identical manner, collecting all the cooked and cooled cans into a single file, and sorting in a binary manner the cans in said single file by grade, to form a different line for each grade.

12. Apparatus for intermingling several groups of food-containing cans and feeding them to a plurality of outlet lines at an outlet in a way that achieves maximum flow through said lines, including in combination: conveyor means for passing cans by each said outlet; means for pulling the cans from said conveyor means into a said outlet up to the capacity of said line; means in each said outlet line for moving the cans therein at a predetermined rate; overflow means at each said outlet for passing to the next said outlet those cans that are kept from entering that outlet by being blocked by other cans in that line; and recirculating means for sending the overflow from the last said outlet into the lane directed to said first outlet.

13. Apparatus for intermingling several groups of food-containing cans and feeding them to a plurality of outlet lines at an outlet in a way that achieves maximum flow through said lines, including in combination: conveyor means; means dividing said conveyor means into a series of lanes corresponding in number to said outlet lines, each said lane directing said cans to an outlet gate for connection of a said line; means for pulling the cans from each lane of said conveyor means into a said outlet up to the capacity of said line; means in each said outlet line for moving the cans therein at a predetermined rate; overflow converging means beyond each said outlet for converging (1) those cans that are kept from entering that outlet by being blocked by other cans in that line with (2) the cans in the next lane, for presentation to the pulling means at the next said outlet, and recirculating means for sending the overflow from the last said outlet into the lane directed to said first outlet.

14. Apparatus for intermingling several groups of food-containing cans and feeding them to a plurality of outlet lines in a way that achieves maximum flow through said lines, including in combination: a closed loop conveyor means; means dividing said conveyor means into a series of lanes corresponding in number to said outlet lines, each said lane directing said cans to an outlet gate for connection of a said line; non-magnetic shield means along the outer edge of said conveyor means adjacent each outlet; a permanent magnet at each said outlet on the upstream side thereof and separated from the then outer lane by said shield means, each lane successively becoming the outer lane as it approaches its said outlet, so that the cans are pulled from said conveyor means into said outlet up to the capacity of said line; means in each said outlet line for moving the cans therein at a predetermined rate; overflow converging means beyond each said outlet for converging (1) those cans that are kept from entering that outlet by being blocked by other cans in that line with (2) the cans in the next lane, for presentation to the magnet at the next said outlet, and recirculating means for sending the overflow from the last said outlet into the lane directed to said first outlet.

15. Apparatus for intermingling several groups of food-containing cans and feeding them to a plurality of outlet lines in a way that achieves maximum flow through said lines, including in combination two belts mounted side by side for movement in opposite directions; means dividing a first said belt into a series of lanes; means for introducing cans into some said lanes; converging plates for moving cans from said some said lanes into other lanes, said other lanes corresponding in number to the number of said outlet lines; means at one end of said belts for transferring said lanes from said first belt to the second said belt, on which said cans reverse direction and each said other lane directs said cans to a gate leading into a said outlet line; non-magnetic shield means along the edge of the outermost lane of said second belt adjacent each said gate; a permanent magnet on the upstream side of each said gate and separated from the outermost said lane by said shield means for pulling the said outermost lane into its associated gate up to the capacity of its said line; means in each said line for moving the cans therein at a predetermined rate; an overflow converging area beyond each said gate for mixing the cans that are kept from entering the preceding gate with the cans in the lane for the next gate; and recirculating means connecting the overflow converging area from the last said gate to the upstream end of said first belt and for guiding that overflow into the lane directed to said first gate.

16. Apparatus for intermingling several groups of food-containing cans and feeding them to a plurality of outlet lines in a way that achieves maximum flow through said lines, including in combination: first and second belts side by side moving in opposite directions; partitions dividing said first belt into a series of lanes; means for introducing cans into some said lanes; converging plates for moving cans from said some said lanes into other said lanes, said other lanes corresponding in number to said outlet lines, each said lane directing said cans to one said outlet line; means at one end of said first belt for guiding said lanes diagonally to move said cans diagonally across said first belt and on to said second belt; means at the same end of said second belt for guiding said lanes diagonally across said second belt for moving said cans toward outlets along an edge of said belt, there being one outlet for each said lane and each said line; non-magnetic shield means along the edge of the outermost lane of said second felt adjacent each outlet; a permanent magnet at each said outlet on the upstream side thereof and adjacent the then outer lane, each lane becoming an outer lane as it approaches its said line, so that the cans are pulled from said second belt into its associated outlet line, up to the capacity of said line; means in each said outlet line for moving the cans therein at a predetermined rate; a series of overflow converging areas on said second belt, each one lying beyond one said outlet, into which said belt moves cans that are kept from entering said outlet by virtue of being blocked by other cans in that line; rotating discs at said overflow converging areas engaging the side walls of cans in the lane for the next outlet as that said lane converges with the overflow from the preceding line; and recirculating means connecting the overflow converging area from the last said outlet to the upstream end of said first belt and for guiding that overflow into the lane directed to said first outlet.

References Cited in the file of this patent

UNITED STATES PATENTS

| | | |
|---|---|---|
| 1,986,543 | Stansbury | Jan. 1, 1935 |
| 2,303,422 | Ball | Dec. 1, 1942 |
| 2,312,114 | Mills | Feb. 23, 1943 |
| 2,472,970 | Hanna | June 14, 1949 |
| 2,502,196 | Ball | Mar. 28, 1950 |
| 2,502,197 | Ball | Mar. 28, 1950 |
| 2,662,017 | Winters | Dec. 8, 1953 |
| 2,817,438 | Birchall | Dec. 24, 1957 |
| 2,989,735 | Gumpertz | June 20, 1961 |